(12) United States Patent
Binder

(10) Patent No.: US 6,311,871 B1
(45) Date of Patent: Nov. 6, 2001

(54) DEVICE FOR PRESSING OUT AND DISPENSING DOSED QUANTITIES OF FLOWABLE MULTIPLE-COMPONENT COMPOUNDS

(75) Inventor: Alfred Binder, Bisngen (DE)

(73) Assignee: Kress-Elektrik GmbH & Co., Bisingen (DE)

( * ) Notice: Subject to any disclaimer, the term of this patent is extended or adjusted under 35 U.S.C. 154(b) by 0 days.

(21) Appl. No.: 09/433,727

(22) Filed: Nov. 4, 1999

(30) Foreign Application Priority Data

Nov. 4, 1998 (DE) .......................................... 298 19 661 U

(51) Int. Cl.[7] ........................................................ B67D 1/08
(52) U.S. Cl. .......................... 222/145.6; 222/94; 222/95; 222/325; 222/326; 222/333
(58) Field of Search ................................ 222/137, 145.6, 222/94, 105, 95, 333, 325, 326

(56) References Cited

U.S. PATENT DOCUMENTS

| 3,570,719 | * | 3/1971 | Schiff .................................... 222/137 |
| 4,432,469 | * | 2/1984 | Eble et al. ............................. 222/134 |
| 4,854,482 | | 8/1989 | Bergner .................................. 222/94 |
| 4,934,827 | * | 6/1990 | Taschke et al. ....................... 366/162 |
| 5,104,005 | * | 4/1992 | Schneider et al. .................... 222/137 |
| 5,875,928 | | 3/1999 | Muller et al. ........................... 222/82 |
| 6,065,645 | * | 5/2000 | Sawhney et al. ...................... 222/137 |
| 6,129,244 | * | 10/2000 | Horth ..................................... 222/94 |

FOREIGN PATENT DOCUMENTS

| 29 49 369 | | 7/1981 | (DE) . |
| 37 05 741 A1 | | 9/1988 | (DE) . |
| 38 23 708 | | 1/1990 | (DE) . |
| 296 03 314 A1 | | 5/1996 | (DE) . |
| 195 00 782 A1 | | 7/1996 | (DE) . |
| 196 18 693 A1 | | 11/1997 | (DE) . |
| 0 313 519 B1 | | 7/1991 | (EP) . |
| 0 603 429 | | 7/1992 | (EP) . |
| 492 412 | | 7/1992 | (EP) . |
| 492413 | * | 7/1992 | (EP) . |
| 541972 | * | 5/1993 | (EP) . |
| WO-98/44860 | * | 10/1998 | (WO) ........................ A61C/1/00 |

* cited by examiner

Primary Examiner—Allan N. Shoap
Assistant Examiner—Melvin A. Cartagena
(74) Attorney, Agent, or Firm—Darby & Darby

(57) ABSTRACT

A device for pressing out and dispensing dosed quantities of flowable multi-component compounds by application of a pressure on flexible bags for the different components comprising a housing with at least two receiving spaces for the flexible bags, the end of which can be closed by a removable cover element, two plunger-like inserts guided for sliding movement in the receiving spaces, for exerting the pressure on the flexible bags, a mixing device equipped with an ejection nozzle and a drive unit comprising an electric motor and a drive spindle, which drives both the plunger-like inserts and the mixing device, is characterized by the fact that the two receiving spaces open into a mixing space accommodating the mixing device and formed in the cover element.

15 Claims, 7 Drawing Sheets

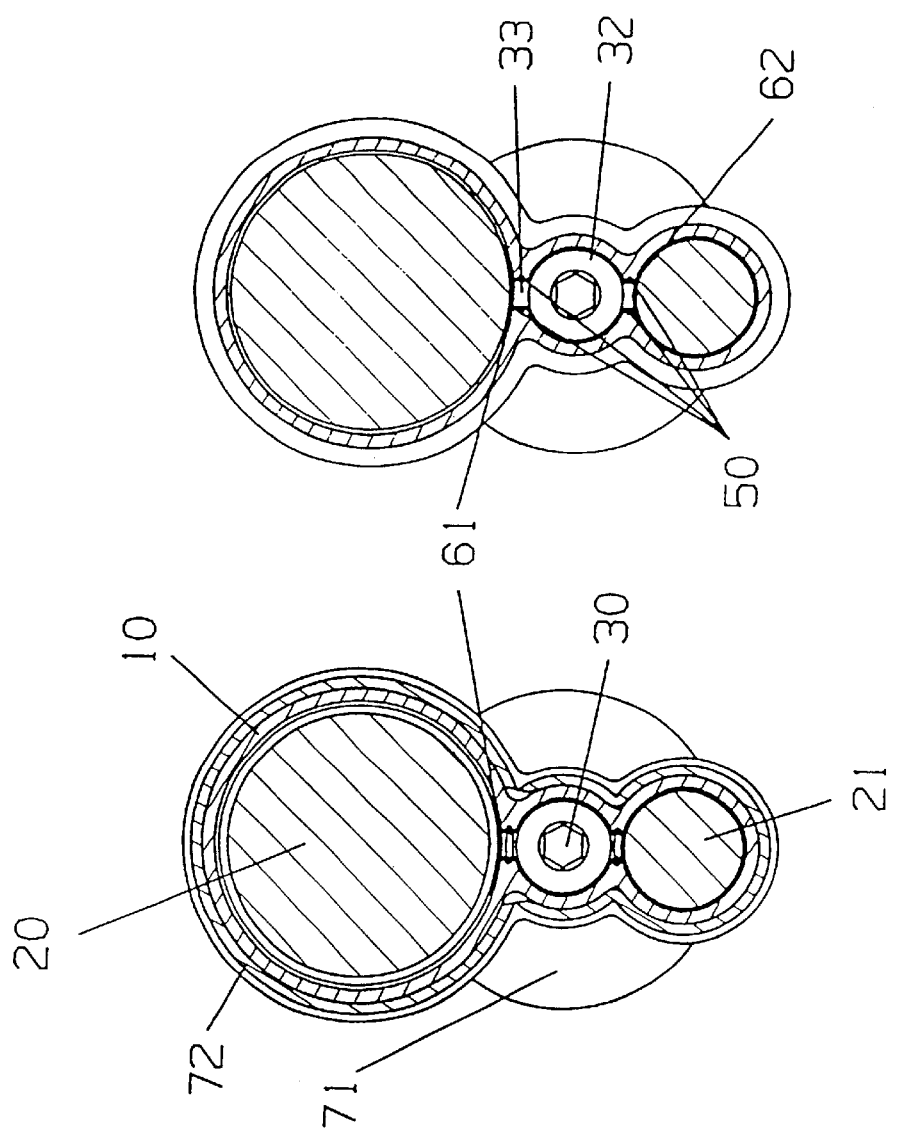

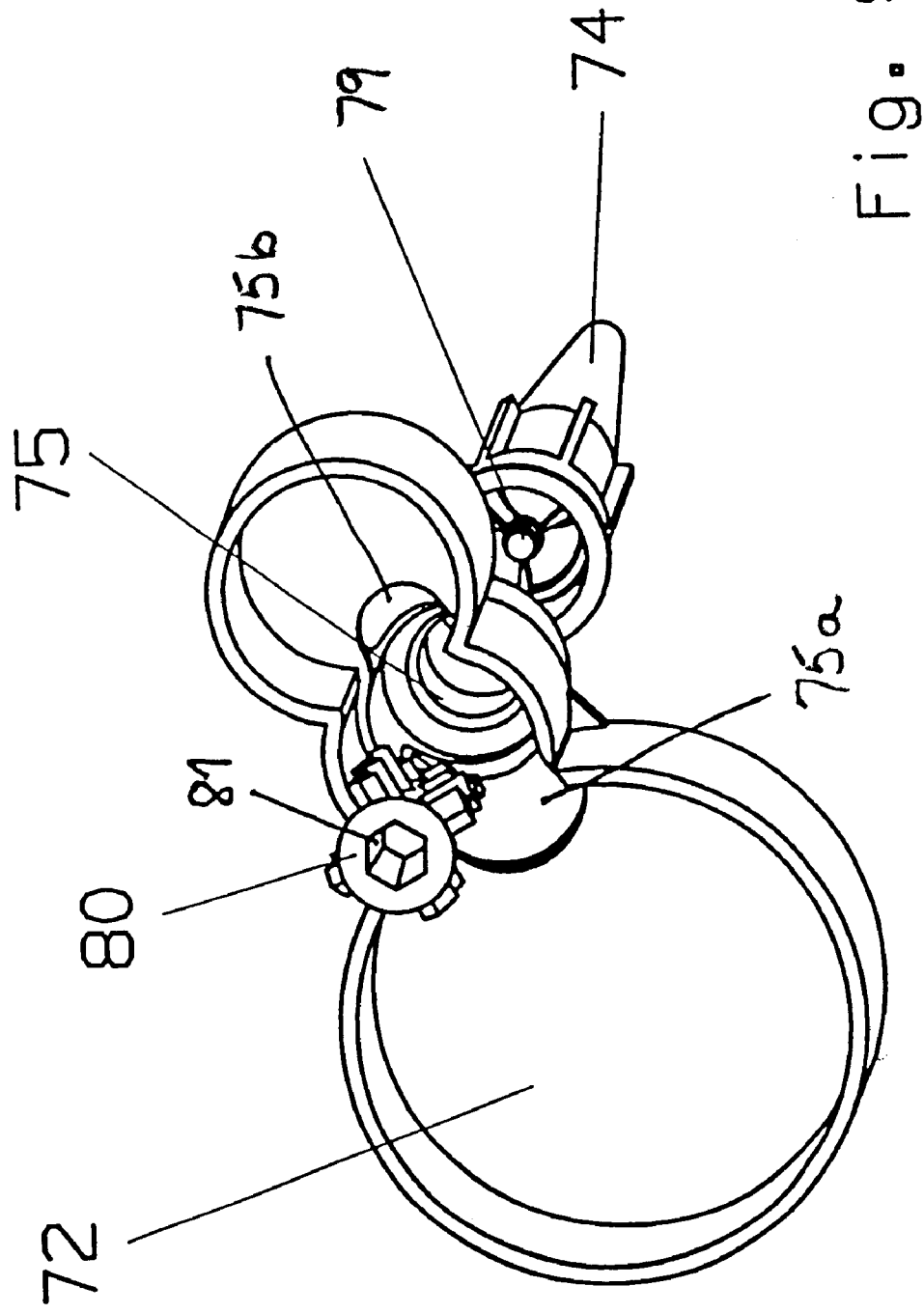

DEVICE FOR PRESSING OUT AND DISPENSING DOSED QUANTITIES OF FLOWABLE MULTIPLE-COMPONENT COMPOUNDS

BACKGROUND OF THE INVENTION

1. Field of the Invention

The present invention relates to a device for pressing out and dispensing dosed quantities of flowable multi-component compounds.

2. Description of Related Art

Multi-component compounds are increasingly used for a great number of applications industry and trade, for gluing, filling, sealing and the like. In order to prevent untimely reaction between the components, it is necessary that the different components be stored in spaces separated one from the other.

A dispensing device for flowable compounds, where a pressure is exerted on the flexible bags for the different components by application of a blowing agent, has been known from German Patent Publication 37 05 741 A1. The blowing agent is supplied into the bags, arranged in the separate containers, via respective metering devices. The metering devices consist, preferably, of volumetric pumps that are driven by electric motors. The flowable compounds are supplied to a mixing device through enlongated lines arranged in a cover element. Even if the bags are completely emptied, a considerable residual quantity remains in those lines. In addition, a device of that kind exhibits a complex structure, which requires pressure lines, relief valves and the like in addition to a tank for the blowing agent. In order to prevent the blowing agent form escaping unintentionally, sealing elements must be provided on the housing. The relief valves of the described device are intended to provide precise dosing; they permit the blowing agent to escape. A device of that kind, therefore, is not unproblematic under aspects of environmental compatibility.

European Patent No. 0 313 519 B1 describes a device for dosing and mixing at least two reaction components, where on the one hand a mixing device is guided for axial displacement by means of a spindle drive via a transmission, while on the other hand two plunger-like inserts for pressing out the cartridges are guided for axial displacement by two additional spindle drives. The two reaction components are supplied to a mixing device via lines that are integrated into the housing. Although it is an advantage of this device that pressing out the cartridges and actuating the mixing device are possible simultaneously and with only one drive spindle, it is a problem that for displacing the two plunger inserts by means of the central spindle drive a transmission and additional spindle drives are required. This leads to a complex structure of the device, which is also prone to failure, and which in addition, due to its many components, has a high weight, which is undesirable for manual operation.

In addition, these spindle drives cannot fully ensure that both cartridges are completely emptied. But even if both cartridges are completely emptied, a residual quantity of the reaction components will remain in the lines in the housing, that lead to the mixing device, and these residual quantities will cure in the course of time. Consequently, a housing of that type can only be used a single time.

German Patent Publications 196 18 693 A1 and 296 03 416 U1 disclose cartridges for component compounds filled into film bags, with storage cylinders arranged in parallel one beside the other and connected via a common inner wall, which have a headpiece or cover element attached to their front end. In the cover element, there are arranged separate channels, which extend in axial direction and are separated by a separating wall and which open into a mixing device. The devices of this type in fact efficiently prevent the two components from being mixed untimely. Mixing of multi-component compounds, especially if they are viscous, is however possible only with difficulty, because of the static mixing device. In addition, the feeding channels to the mixing device are relatively long with these devices as well, so that after the two bags have been emptied completely, there will also remain a considerable residual quantity in the cover element.

SUMMARY OF THE INVENTION

It is an object of the present invention to improve a device for pressing out and dispensing dosed quantities of flowable multi-component compounds of the described species in such a way that safe operation is ensured with the simplest possible structure, which comprises only a few parts, and that it is especially ensured that the two flexible bags can be emptied almost completely.

The device according to the invention provides the advantage that it permits the flexible bags to be emptied practically completely. There only remains a minimum residual quantity in the cover element, which is designed as a single-use element.

Advantageously, the mixing space formed in the cover element is arranged in such a way that its ends flush with the drive spindle and is connected with the receiving spaces through laterally attached channels. This allow a particularly compact structure of small volume.

At its ejection end, the mixing space is closed off by a removable ejection nozzle that can be exchanged for different requirements. This structure not only guarantees high versatility, but also reduces the number of parts, that must be discarded after use of the device, to the cover element and the ejection nozzle. The housing can be reused.

Especially with a view to achieving a compact structure it is provided in this connection that a bearing for seating the mixing device, preferably a mixing screw or the like, is arranged in the ejection nozzle.

According to a particularly advantageous embodiment of the invention, which especially allows the two flexible bags to be emptied practically completely, it is provided that the two plunger-like inserts are rigidly connected one with the other and with a nut seated for axial displacement in the housing and running on the drive spindle. This on the one hand guarantees the safe functioning of the device and ensures that pressure is always exerted simultaneously on both flexible bags. On the other hand, it also considerably reduces the weight of the entire device, especially due to the fact that the two plunger-like inserts in the nut are preferably made as a single piece.

Preferably, it is provided that the drive spindle is rotatably seated in a spindle space, which is arranged between the two receiving spaces and is formed integrally with the latter.

As regards the design of the receiving spaces, the most diverse embodiments are imaginable. Preferably, it is provided that the receiving spaces have a cylindrical, preferably a circular cylindrical shape. Such a circular cylindrical shape not only can be produced in a simple way, but also allows optimum guiding of the plunger-like inserts on large guide surfaces.

The two plunger-like inserts are preferably connected with each other and with the nut by a crossover extending substantially vertically relative to the drive spindle, the crossover being seated in the housing for sliding displacement in axial direction and projecting through openings that extend in axial direction and open into the receiving spaces.

Preferably, the crossover has a disk-like shape, viewed in the direction of displacement, which projects through openings that extend in slot-like form in the direction of displacement. This on the one hand has the result that the openings exhibit a smaller cross-sectional area, which is an advantage especially with respect to the tight closing of the receiving spaces that hold the flexible bags of the multi-component compound. On the other hand, the disk-like shape of the crossover, in the direction of displacement, additionally provides high stability and optimum seating and guidance for the crossover.

Preferably, the openings, which extend in slot-like shape in axial direction, are closed off by articulated sealing members that can be opened and closed by an axial movement of the crossover.

The crossover is supported for sliding movement on support elements arranged between the two cylindrical receiving spaces and extending, preferably in the form of a line, in the direction of displacement. These support elements may consist, for example, of steel wires or the like mounted under tension in the housing.

In order to ensure optimum and trouble-free, especially low-friction operation of the two plunger-like inserts it is advantageously provided that the drive spindle and the nut form together a ball-and-screw spindle drive.

BRIEF DESCRIPTION OF THE DRAWINGS

Further advantages and features of the invention will appear from the description that follows and from the drawings showing one embodiment of the invention.

In the drawings:

FIG. 6 shows a sectioned representation of the housing, along line VI-VI in FIG. 3;

FIG. 7 shows a sectioned representation of the housing, along line VII-VII in FIG. 3;

FIG. 8 shows a sectioned representation of the housing, along line VIII-VIII in FIG. 3; and FIG. 9 shows a perspective view of a removable cover element of a device according to the invention.

DESCRIPTION OF THE PREFERRED EMBODIMENTS

Figure 1:
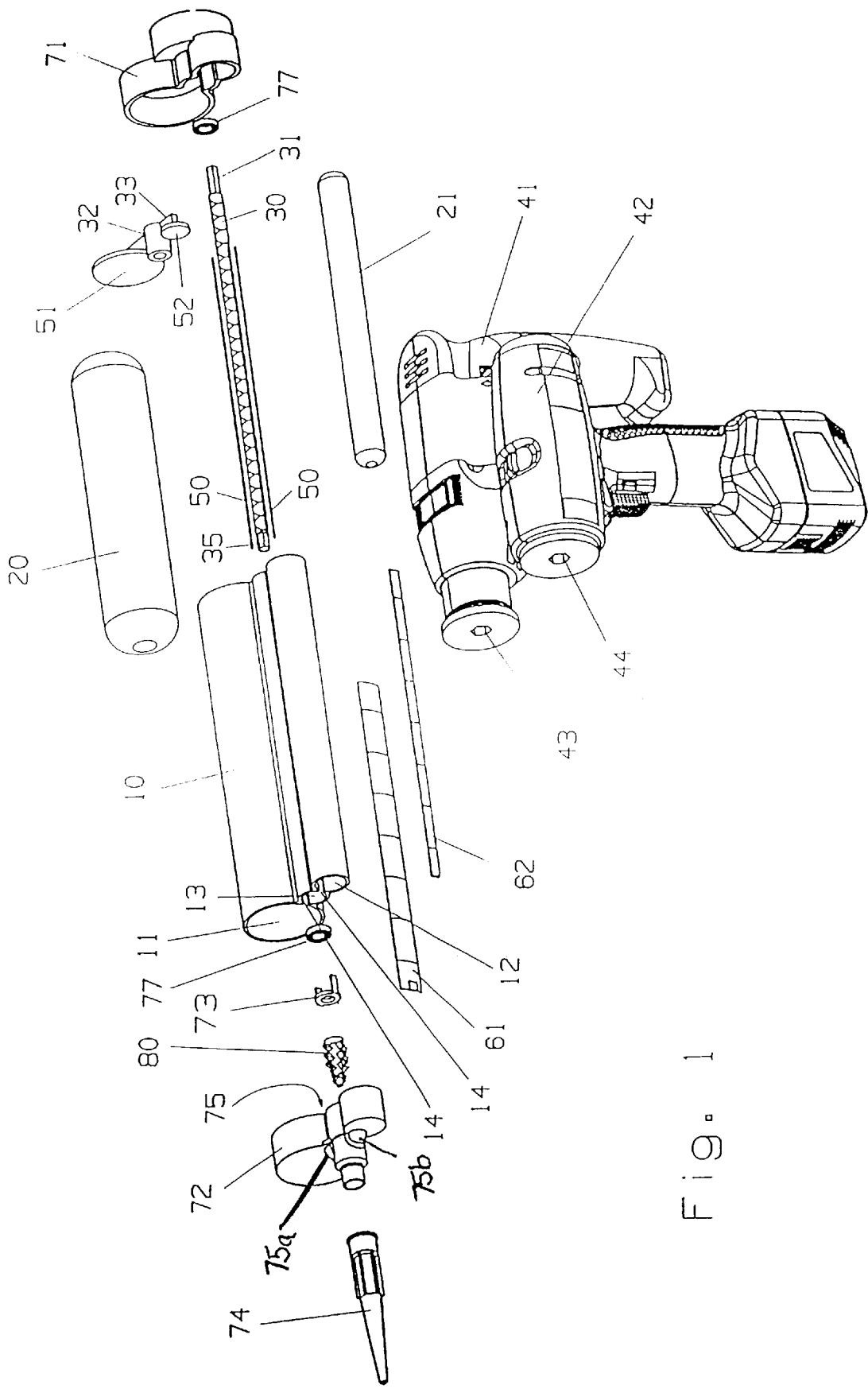
FIG. 1 shows an exploded view of a device using the invention.
Figure 2:
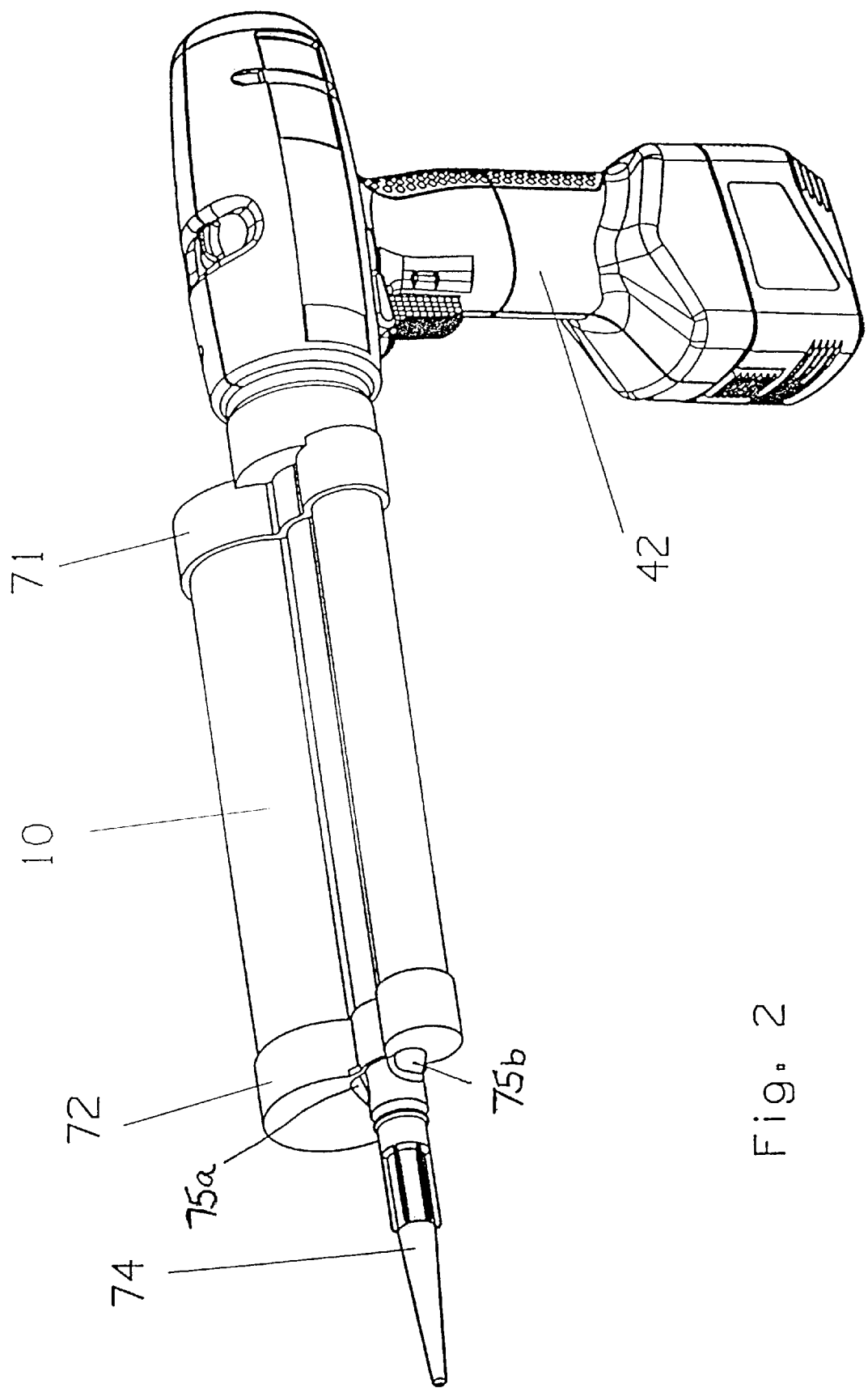
FIG. 2 shows a battery-operated device according to the present invention, in assembled condition.
Figure 3:
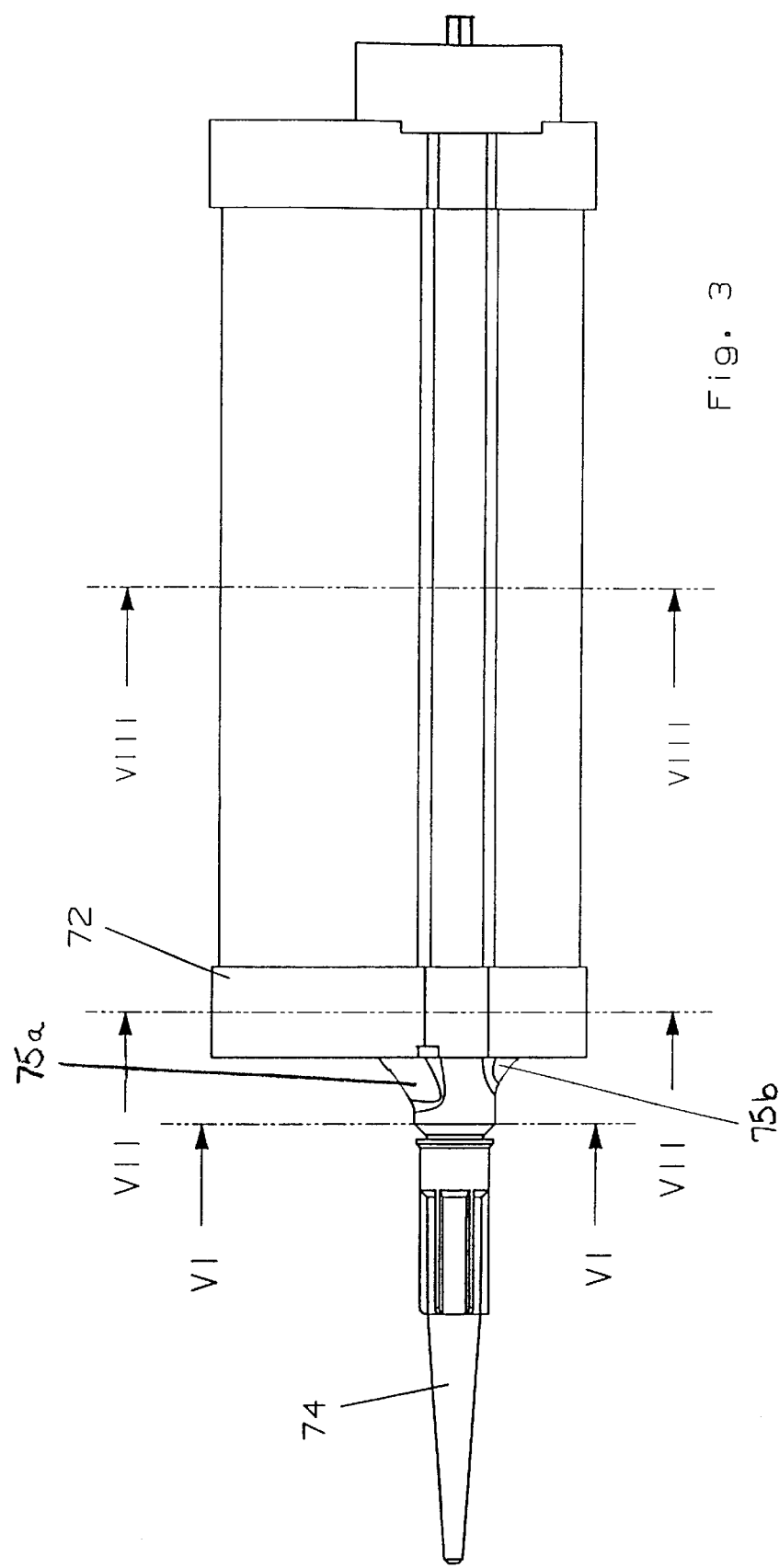
FIG. 3 shows a side view of the housing, where the electric drive has been omitted.
Figure 4:
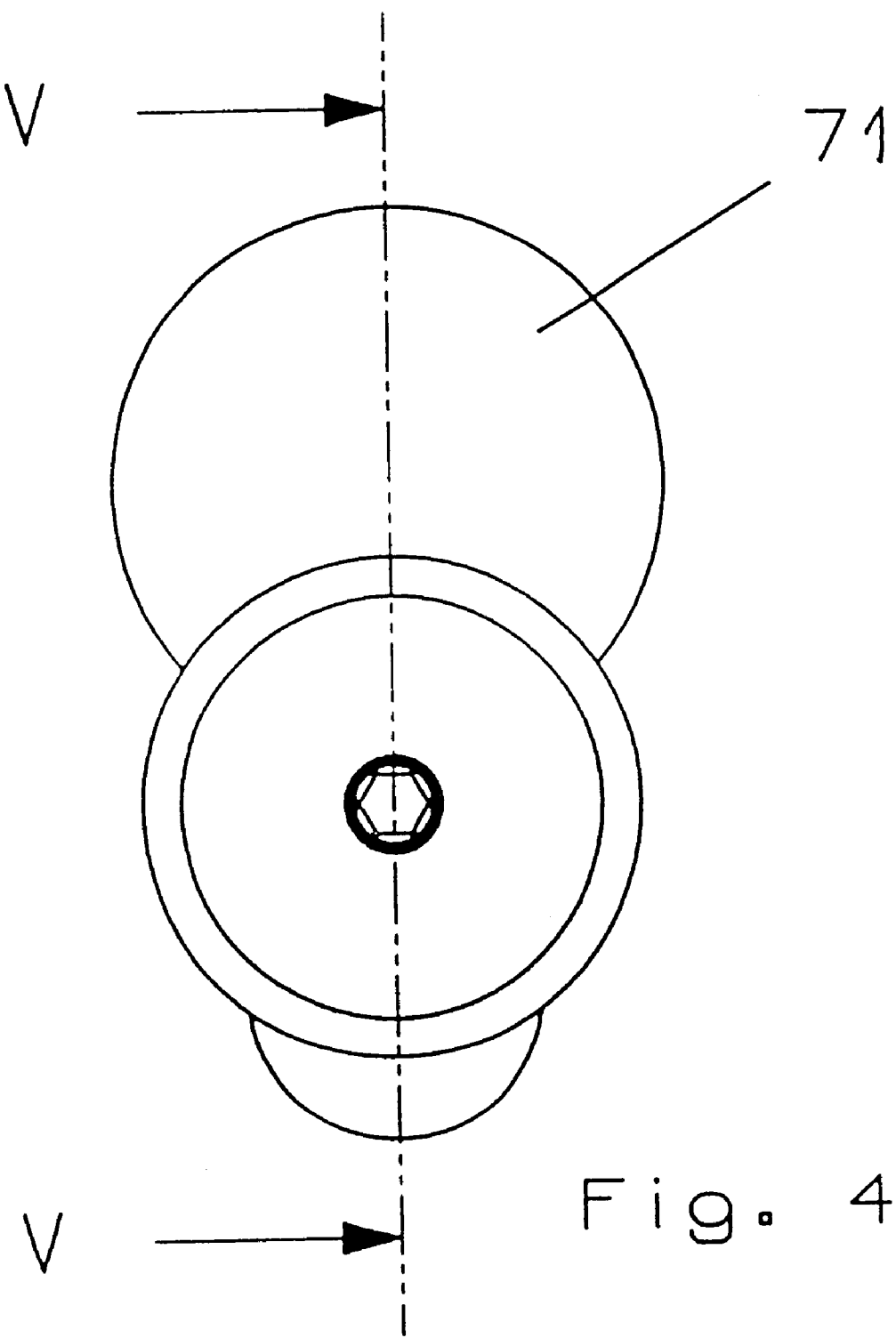
FIG. 4 shows an end view of the housing of FIG. 3.

A device for pressing out and dispensing dosed quantities of flowable multi-component compounds, as shown in the drawings, comprises a housing 10, which is adapted for receiving two flexible bags 20, 21 of the flowable multi-component compound in two receiving spaces 11 and 12. Between the two substantially circular cylindrical receiving spaces 11, 12 there is provided a spindle space 13 for accommodating and seating, via bearing elements 77, a drive spindle 30 which can be driven by a mains-operated electric tool 41 or a battery-operated tool 42 known as such (see especially FIG. 5). The drive spindle 30 is provided for this purpose at its end facing the electric tool 41, 42 with a form-locking profile, preferably a hexagonal profile 31, that can be fitted positively and in friction-locking fashion in a matching receiving element 43 or 44, respectively, of the tool 41 or 42, respectively.

Figure 5:
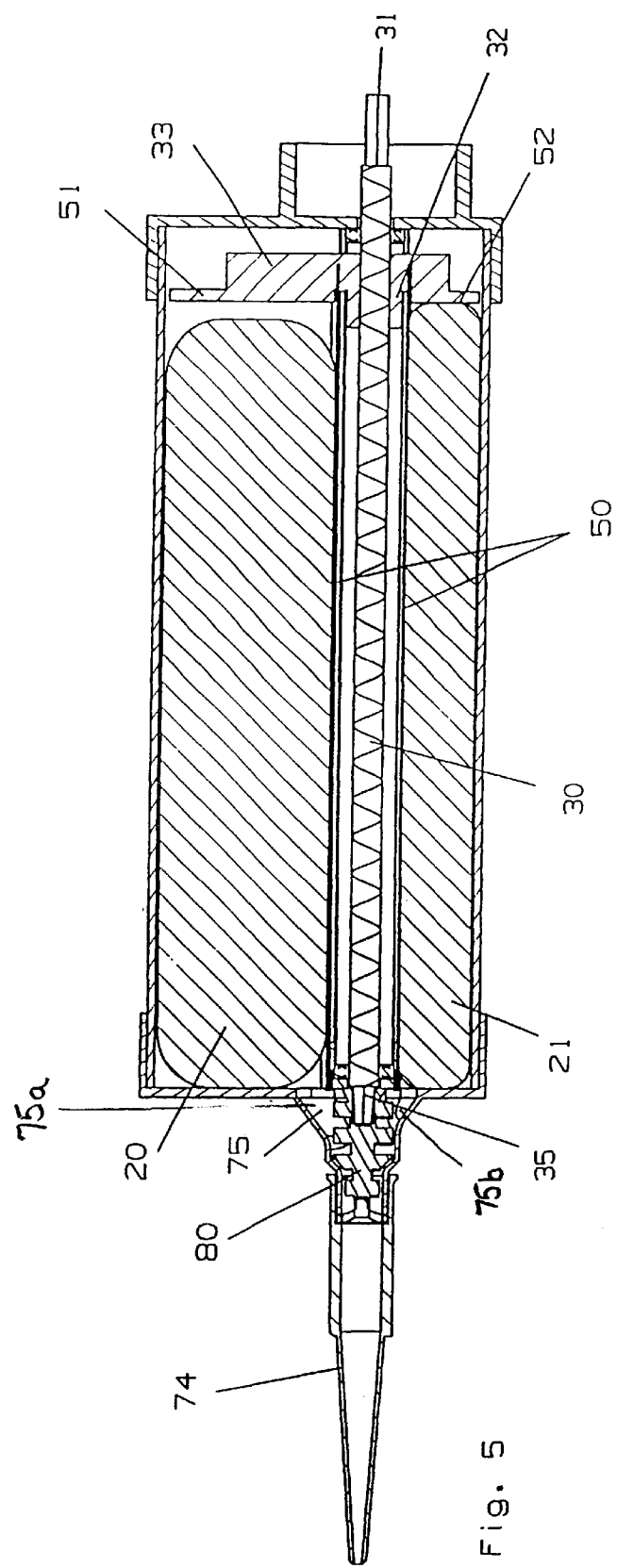
FIG. 5 shows a sectioned representation of the housing, along line V-V in FIG. 4.

A nut 32 running on the drive spindle 30 is rigidly connected with two plunger-like inserts 51, 52, via a crossover 33 that extends in disk shape in the direction of displacement (see FIGS. 1 and 5). In the assembled condition, the two plunger-like inserts 51, 52 slide in axial direction in the two receiving spaces 11, 12, driven by the drive spindle 30, thereby exerting an extrusion pressure on the two flexible containers 20, 21.

In order to prevent any torque from being exerted upon the two plunger-like inserts 51, 52, which would increase the friction encountered during the sliding movement of the plunger-like inserts 51, 52 in the two receiving spaces 11, 12, it is provided that the crossover 33 is supported in the direction of displacement on steel wires 50, or other support elements extending in the form a line, mounted under tension in axial direction in the housing 10.

As can be seen especially in FIGS. 1, 5 and 8, slot-shaped openings 14, through which the crossover 33 projects and which extend in the direction of displacement and open into the two receiving spaces 11, 12, are provided in the housing 10. These disk-shaped openings 14 are closed off by articulated sealing elements 61, 62 that can be opened and closed by an axial movement of the crossover 33. In this way it is prevented that the multi-component compound present in the receiving spaces 11, 12 can escape toward the drive spindle 30 and impair its function.

The housing 10 is closed off at its end by cover elements 71, 72. The receiving space 13, accommodating the drive spindle 30, is closed off by sealing elements 73. In the removable cover element 72 on the extrusion side, a mixing space for accommodating a mixing screw is formed, into which the two receiving spaces 11, 12 directly open (see especially FIG. 9). The ejection nozzle 74 can be secured to that cover element 72.

On its side facing the mixing screw 80, the drive spindle 30 is likewise provided with a form-locking profile, for example a hexagonal profile 35, that engages into a recess 81, complementary to the profile 35, formed in the mixing screw 80. In this way, the mixing screw 80 can be set into rotation by a rotary movement of the drive spindle 30, so that effective mixing of the two components is achieved in the mixing space 75. Adjacent the ejection nozzle 74 the mixing screw 80 is seated in a bearing 79 arranged in the ejection nozzle 74.

As is apparent especially from FIGS. 1, 2, 3, 5 and 9, the mixing space 75 ends flush with the drive spindle 30. The receiving spaces 11, 12 open into the mixing space 75 via laterally attached channels 75a, 75b. The particular configuration of the mixing space 75 as part of the cover element 72 and the arrangement of the mixing channels 75a, 75b that open laterally into the mixing space 75, together with the before-described manner of guiding the plunger-like inserts 51, 52, make it possible for the two flexible bags 20, 21 to be emptied practically completely, with only a small residual quantity of the multi-component compound remaining in the two receiving spaces 11, 12 and the removable cover element 72. It is also a particular advantage in this connection that only the cover element 72 and the injection nozzle 74 must be discarded after use of the device, whereas the housing 10 can be reused without limitation.

The device operates as follows:

By actuating the mains-operated or battery-operated tool 41, 42, the drive spindle 30 is set into rotation, as a result of which the two plunger-like inserts 51, 52 move toward the ejection nozzle 74. At the same time, the mixing screw 80 in the receiving space 75 is set into rotation. This rotary movement of the mixing screw 80 has the effect on the one hand to reduce the pressure exerted upon the two plunger-like inserts 51, 52 during tensioning, while on the other hand good mixing of the two components of the pasty multi-component compound is achieved. This considerably reduces the extrusion forces so that only a small drive motor, i.e. a small hand tool 41, 42 is required. And this also results, especially, in a smaller, compact and therefore low-cost structure of the entire device, which is connected with a reduction in weight as compared with known devices.

What is claimed is:

1. A device for pressing out and dispensing dosed quantities of flowable multi-component compounds by application of a pressure on flexible bags, comprising:

a housing with at least two receiving spaces for receiving the flexible bags;

two plunger inserts displaceable within the respective receiving spaces for exerting pressure on the flexible bags;

a mixing device including an ejection nozzle and a drive unit, the drive unit including an electric motor and a drive spindle for driving said plunger inserts and said mixing device;

a removable cover for closing an end of the receiving spaces, the cover forming a mixing space and accommodating said mixing device, the receiving spaces opening into the mixing space; and a bearing disposed in said ejection nozzle for seating said mixing device.

2. The device in accordance with claim 1, wherein the mixing space terminates substantially flush with the drive spindle and is connected with the receiving spaces via laterally connected channels.

3. The device in accordance with claim 1, wherein the mixing space has an ejection end that is closed off by a removable ejection nozzle.

4. The device in accordance with claim 1, wherein said plunger inserts are rigidly connected to one another and to a nut seated for axial displacement in said housing along said drive spindle.

5. The device in accordance with claim 1, wherein said drive spindle is rotatably seated in a spindle space disposed between and formed integrally with the two receiving spaces, the spindle space having a sealed ejection end.

6. The device in accordance with claim 1, wherein the receiving spaces have a cylindrical shape.

7. The device in accordance with claim 1, wherein the receiving spaces have a circularly cylindrical shape.

8. The device in accordance with claim 1, wherein said housing is a molded part.

9. The device in accordance with claim 1, wherein said housing is an extruded part.

10. The device in accordance with claim 1, wherein said drive spindle is a ball-and-screw spindle.

11. A device for pressing out and dispensing dosed quantities of flowable multi-component compounds by application of a pressure on flexible bags, comprising:

a housing with at least two receiving spaces for receiving the flexible bags;

two plunger inserts displaceable within the respective receiving spaces for exerting pressure on the flexible bags;

a mixing device including an ejection nozzle and a drive unit, the drive unit including an electric motor and a drive spindle for driving said plunger inserts and said mixing device; and a removable cover for closing an end of the receiving spaces, the cover forming a mixing space and accommodating said mixing device, the receiving spaces opening into the mixing space;

said plunger inserts being connected to one another and to a nut via a crossover extending substantially perpendicular relative to said drive spindle, said crossover being seating in said housing for sliding displacement in an axial direction and projecting through openings extending in an axial direction and opening into the receiving spaces.

12. The device in accordance with claim 11, wherein the openings are slot shaped.

13. The device in accordance with claim 12, wherein said crossover being disk-shaped when viewed in a direction of displacement, that projects through the slot shaped openings in the direction of displacement.

14. The device in accordance with claim 12, further comprising articulated sealing members for opening and closing the openings by axial movement of said crossover.

15. The device in accordance with claim 11, further comprising support elements disposed between the receiving spaces and extending in a direction of displacement for supporting said crossover during sliding displacement.

* * * * *

UNITED STATES PATENT AND TRADEMARK OFFICE
CERTIFICATE OF CORRECTION

PATENT NO. : 6,311,871 B1
DATED : November 6, 2001
INVENTOR(S) : Alfred Binder

It is certified that error appears in the above-identified patent and that said Letters Patent is hereby corrected as shown below:

<u>Title page, Item [54] and Column 1, lines 1-4,</u>
Title, change "DEVICE FOR PRESSING OUT AND DISPENSING DOSED QUANTITIES OF FLOWABLE MULTIPLE-COMPONENT COMPOUNDS" to
-- DEVICE FOR PRESSING OUT AND DISPENSING DOSED QUANTITIES OF FLOWABLE MULTI-COMPONENT COMPOUNDS --.
Item [75], Inventor, change "Bisngen" to -- Bisingen --.

Signed and Sealed this

Tenth Day of December, 2002

JAMES E. ROGAN
*Director of the United States Patent and Trademark Office*